F. G. LEE.
FASTENER FOR HEADLIGHT LENSES.
APPLICATION FILED MAY 31, 1919.
1,364,564.
Patented Jan. 4, 1921.
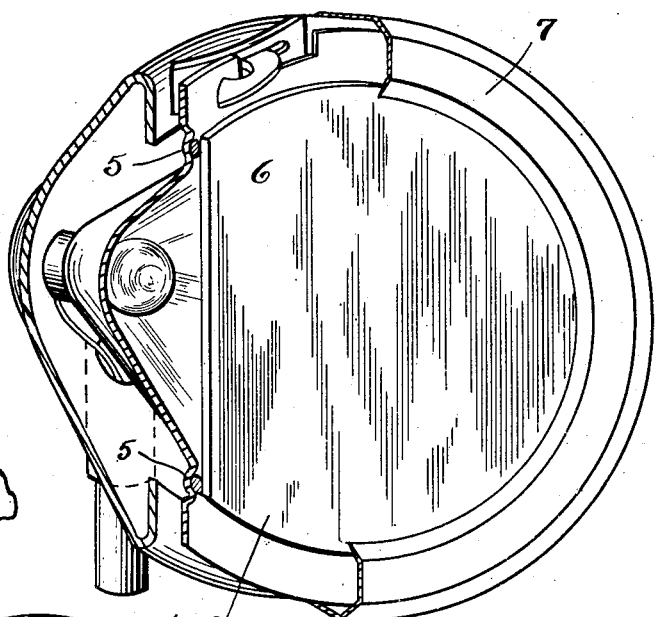
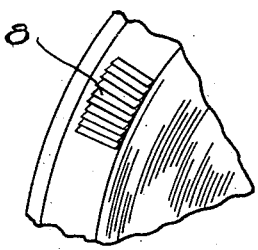
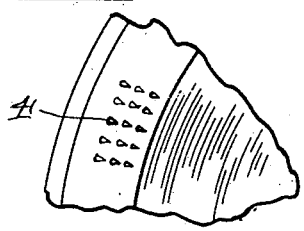
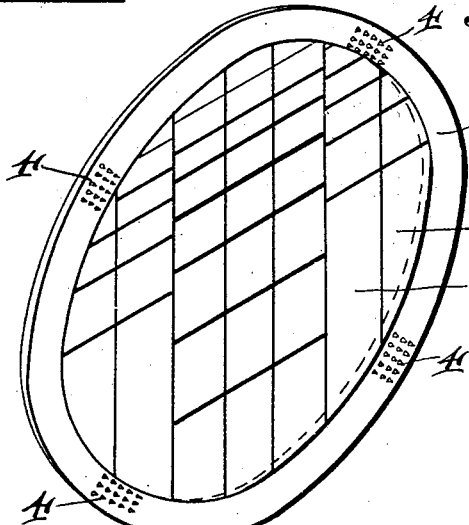
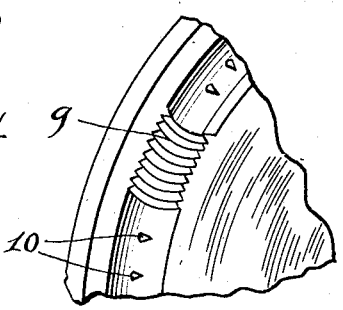
Inventor
FREDERICK G. LEE
Witness
Alfred Ischinger
By Frank Kiefer
Attorney

UNITED STATES PATENT OFFICE.

FREDERICK G. LEE, OF ROCHESTER, NEW YORK.

FASTENER FOR HEADLIGHT-LENSES.

1,364,564.           Specification of Letters Patent.          Patented Jan. 4, 1921.

Application filed May 31, 1919. Serial No. 300,916.

*To all whom it may concern:*

Be it known that I, FREDERICK G. LEE, a citizen of the United States, residing at Rochester, in the county of Monroe and State of New York, have invented certain new and useful Improvements in Fasteners for Headlight-Lenses, of which the following is a specification.

The object of this invention is to provide an improvement in lenses and more especially automobile, street cars and locomotive headlight lenses.

Automobile headlight lenses are now being made to throw the light in a particular direction other than straight ahead and evenly distributed around the center of the lens. More especially they are desired to throw the light downward on the road rather than straight ahead or upward into the air or to either side of the road. A lens which is made to throw the light downward on the road and at the sides uniformly, will only fulfil its purpose when it is set and held in the correct position. Such lenses frequently have features thereon which must remain in one fixed position and to hold the lens when its features are in that position, it is necessary to hold the lens against rotation. If the lens is square or oblong, there will probably be no tendency to rotate on its seat, but lenses which are circular in form can be supported in any angular position on their seats and can easily rotate or shift from one position to another.

My improvement consists in using certain devices for the purpose of holding circular lenses in the desired position and preventing them from shifting from that position. My invention is applicable to all such lenses in which this fixed position is desirable whatever the features of the lenses may be that make an angular movement of the lenses from that position objectionable.

These and other objects of the invention will be illustrated in the drawings, described in the specification and pointed out in the claim at the end thereof.

In the accompanying drawings,

Figure 1 is a detail view of a portion of a headlight showing the devices used for holding a lens in position thereon.

Fig. 2 is a perspective view of a lens arranged to refract the light in a given direction, which lens is provided with devices for holding the lens against rotation.

Fig. 3 is an enlarged detail view of the holding devices shown in Fig. 2.

Figs. 4 and 5 show modifications of the holding device.

In the accompanying drawings, like reference numerals indicate like parts.

In the drawings,

Reference numeral 1 indicates a lens having a series of prisms or refracting devices 2 placed thereon. The lens is provided with a rim 3 which is plain or rough and at suitable intervals around the periphery thereof the rim of the lens is provided with teeth or projections 4.

Headlights are usually made with a circular seat 5 having a soft lining, such as a cord or circular pad, as is indicated at 6, on one side thereof and a clamping or clasping device such as the ring 7 for holding the lens against this soft material which forms the seat or a part of it. Such a device is shown in Fig. 1. The ring 7 may be fastened to the headlight in any suitable manner, as it constitutes no part of my invention.

The teeth 4 are provided on the lens to engage with this soft material in the seat in the headlight sufficiently to hold the lens positively against angular movement. Because of this if the lens is once placed in correct position in the headlight and clamped therein with the teeth in engagement with the lining, it will not be jarred out of that position when the automobile travels over a rough road.

In Figs 4 and 5 I have shown modifications of the fastening device which consists of straight ridges 8 in Fig. 4 and curved ridges 9 in Fig. 5. These are provided for the purpose of engaging with the relatively soft lining material used in seat of the headlight for the purpose of holding the lens against rotation when the lens is clamped therein.

In Fig. 5 an annular groove is shown that is intended to engage with the cord 6. In this groove is placed either the ridges 9 or the teeth 10.

It will be understood that the teeth 4 or ridges 8 and 9 may be provided on both sides of the lens so that they not only engage the lining 5 but also the rim 7 which holds the lens in place on the lining 5.

I claim:

A lens having a rim thereon capable of engaging with a seat adapted to support the lens, groups of pointed teeth on said rim, projecting from said rim toward said seat, said teeth in each group being in a series of concentric rows, said teeth being adapted to make positive engagement with the seat to hold the lens from rotation thereon.

In testimony whereof I affix my signature.

FREDERICK G. LEE.